Nov. 8, 1949  O. W. SCHOTZ  2,487,482
TRANSMISSION CONTROL
Filed June 19, 1947  4 Sheets-Sheet 1
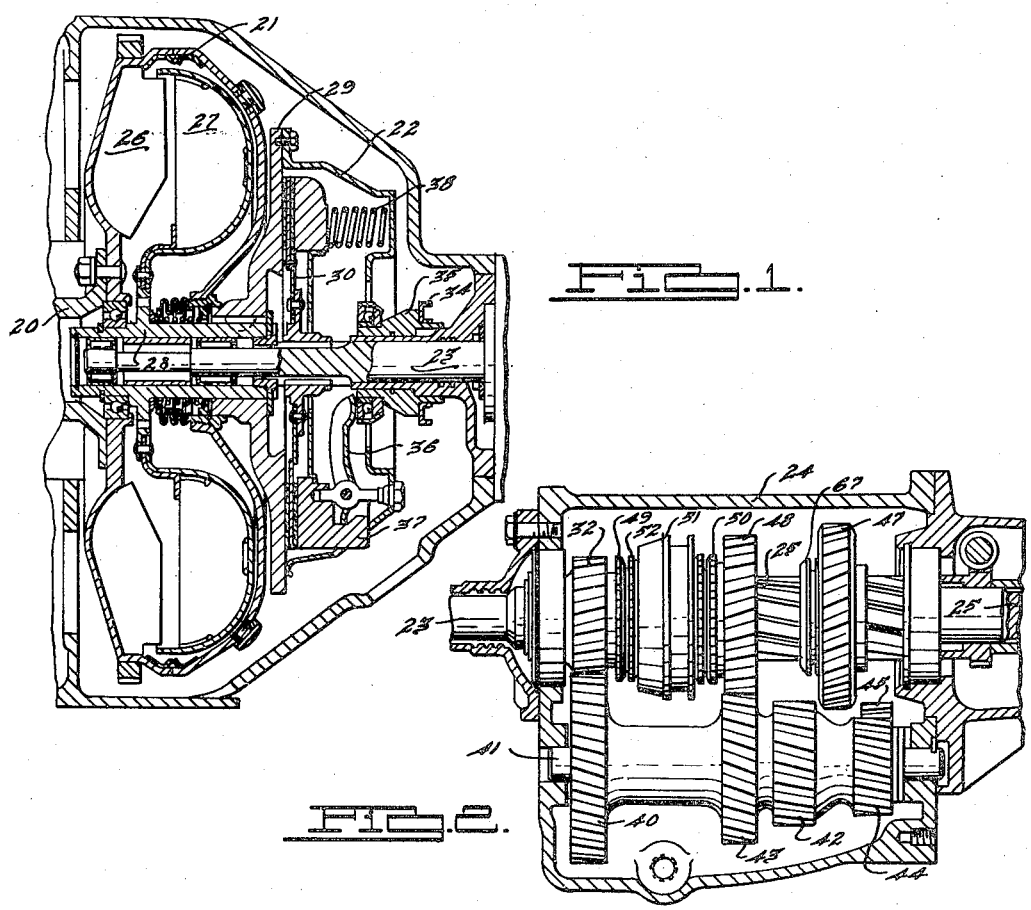
INVENTOR.
Otto W. Schotz.
BY
Harness and Harris
ATTORNEYS.

Nov. 8, 1949  O. W. SCHOTZ  2,487,482
TRANSMISSION CONTROL

Filed June 19, 1947  4 Sheets-Sheet 2

INVENTOR.
Otto W. Schotz.
BY
Harness and Harris
ATTORNEYS.

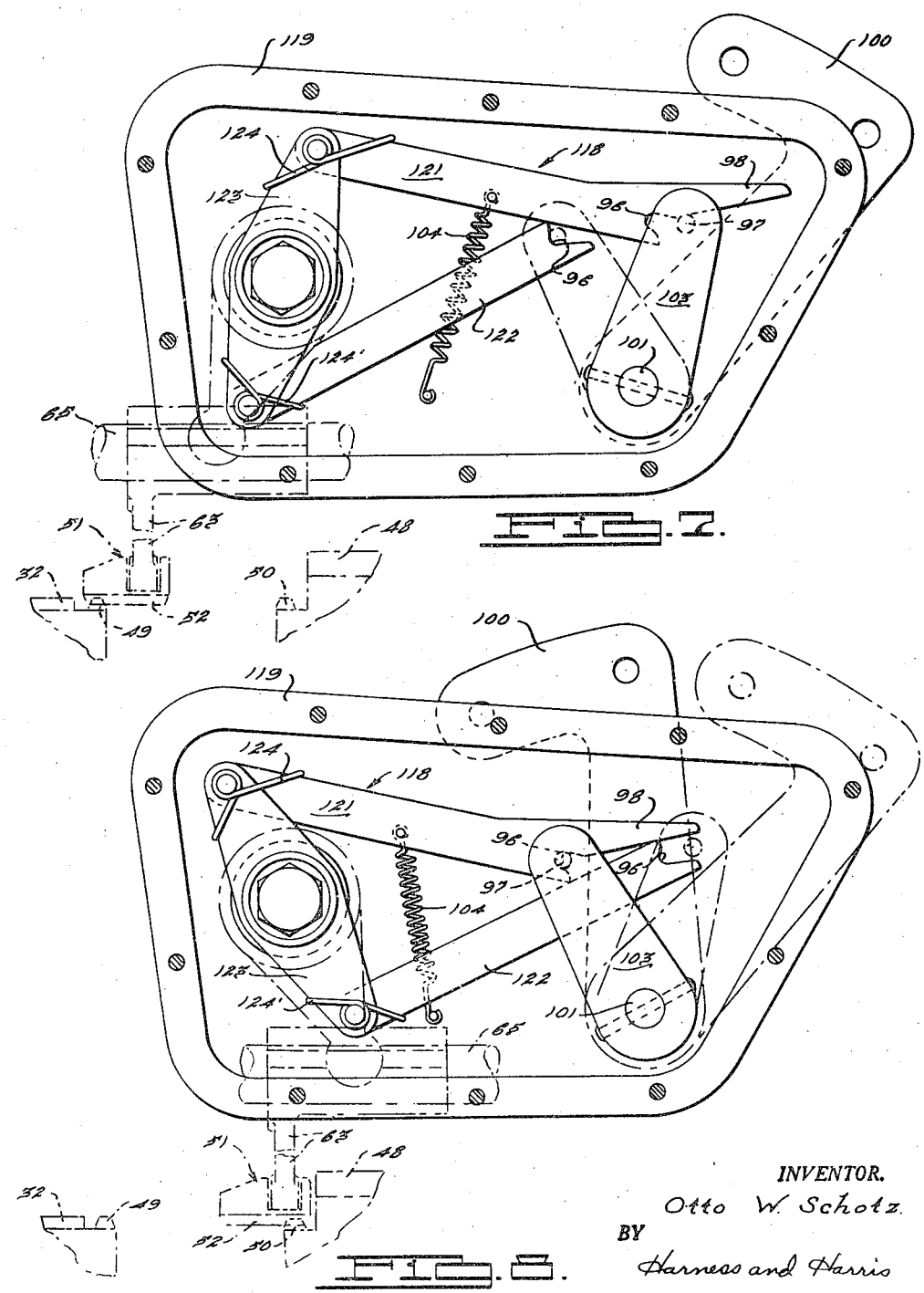

Nov. 8, 1949     O. W. SCHOTZ     2,487,482
TRANSMISSION CONTROL
Filed June 19, 1947     4 Sheets-Sheet 4
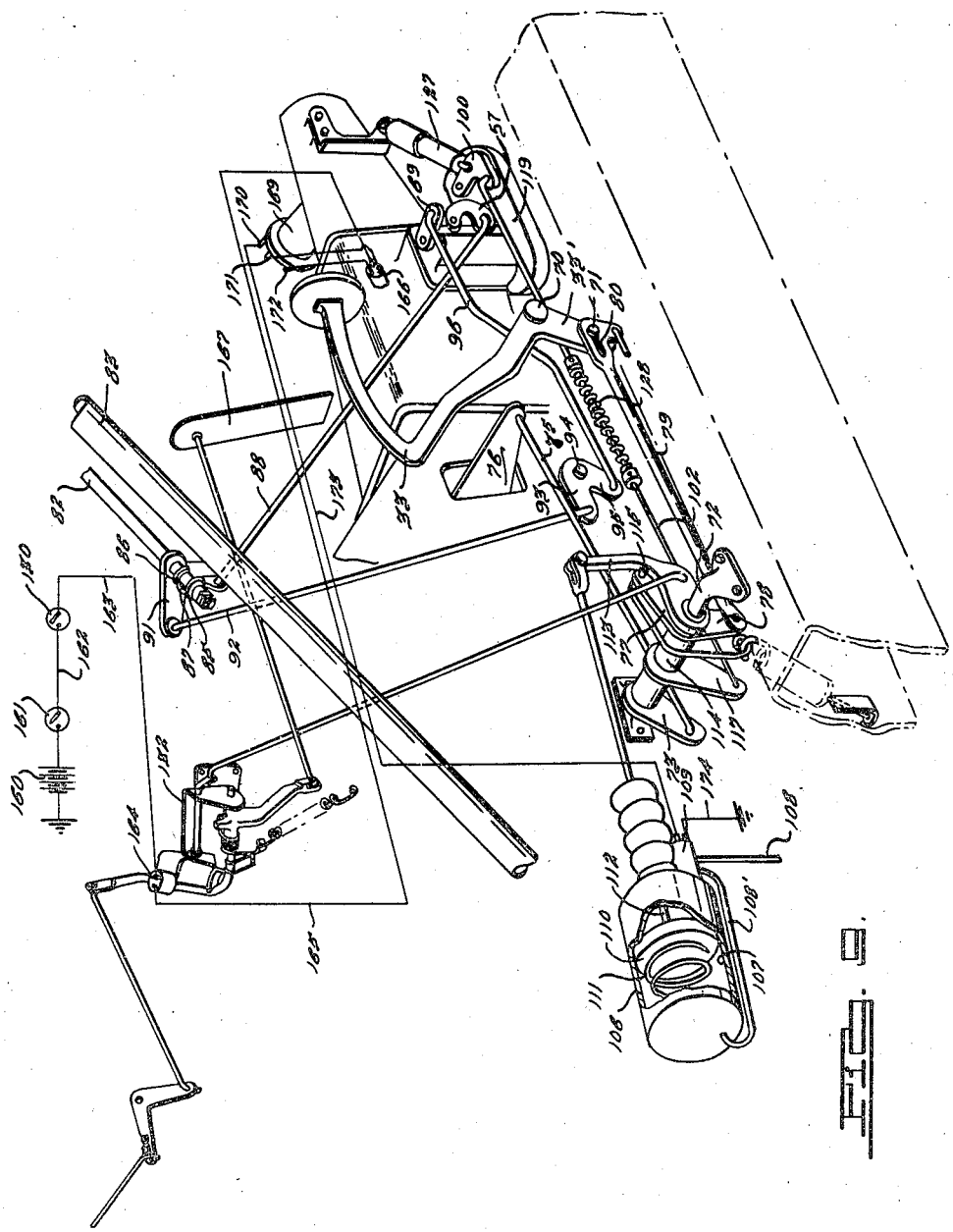
INVENTOR.
Otto W. Schotz.
BY
Harness and Harris
ATTORNEYS.

Patented Nov. 8, 1949

2,487,482

UNITED STATES PATENT OFFICE 2,487,482

TRANSMISSION CONTROL

Otto W. Schotz, Detroit, Mich., assignor to Chrysler Corporation, Highland Park, Mich., a corporation of Delaware Application June 19, 1947, Serial No. 755,661

3 Claims. (Cl. 74—473)

1

This invention relates to automotive vehicle transmission controls and more particularly to a mechanism adapted to alternately move a transmission control member in a first direction and in a second direction in response to successive cycles of reciprocation of a power member.

Apparatuses for automatically changing speed ratio drives in motor vehicle transmissions have been developed. These apparatuses are usually responsive to driver signal as, for example, by throttle closing within predetermined vehicle speed limits to initiate a cycle including a change in transmission speed ratio drive as described in my copending applications, Serial Numbers 687,247 and 687,248.

These apparatuses provide a power member, such as a piston, and means to move the power member through a cycle such as reciprocation in a first direction and return in response to predetermined vehicle operating conditions. The associated transmission in which the change in speed ratio drive is to be effected in response to movement of the power member through its cycle is usually provided with a component in the nature of a shift rail which can be moved in a first direction to effect one speed ratio drive and in a second direction to effect another speed ratio drive. It is an object of this invention to provide an improved motion translating mechanism capable of moving the transmission component in the first direction in response to one cycle of movement of said power member and of moving the transmission component in its second direction in response to a successive cycle of movement of the power member.

It is an additional object of the invention to provide a motion translating unit which when assembled has no slots or other large openings in its case through which dirt and water may penetrate.

It is a further object of the invention to guide the motion of the moving parts of the motion translating mechanism by the respective engaging surfaces of the parts and thereby to eliminate any additional parts or slots for guiding the motion of these parts.

The invention will be described herein in conjunction with a suggested transmission and clutch control apparatus as a typical application thereof although it is not intended that the invention be limited to the associated apparatus described therein.

In the drawings:

Fig. 1 is a longitudinal sectional elevation through the main clutch mechanism;

2

Fig. 2 is a vertical section of a transmission;

Fig. 3 is a sectional elevation of a portion of the mechanism carried by the transmission housing;

Fig. 7 is a view taken on the line 7—7 of Fig. 6 looking upward into the housing with the base plate removed and with associated transmission components illustrated by dot and dash lines;

Fig. 8 is a view similar to Fig. 7 but showing the motion translating mechanism in a different position; and Fig. 9 is a diagrammatic view of a transmission and clutch control apparatus of which my invention forms a component part.

Figure 4:
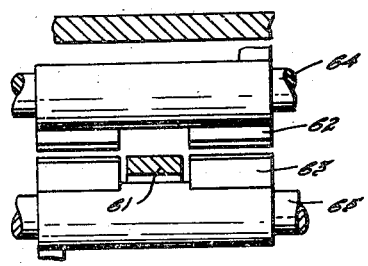
Fig. 4 is a section on the line 4—4 of Fig. 3.

In a motor vehicle, the usual internal combustion engine having a crankshaft 20 drives through fluid coupling 21 and a conventional type of friction main clutch 22 through shaft 23 to a variable speed ratio transmission 24 from which the drive passes from the output shaft 25 to the vehicle rear wheels in the usual manner.

The engine crankshaft 20 carries the vaned fluid coupling impeller 26 which in the well known manner drives the vaned runner 27 whence the drive passes through hub 28 to clutch driving member 29. This member then transmits the drive when clutch 22 is engaged as in Fig. 1, through driven member 30 to the transmission driving shaft 23 carrying the main drive pinion 32. A clutch pedal 33 controls clutch 22 such that when the driver depresses this pedal yoke 34 and collar 35 are thrust forward to cause levers 36 to release the clutch driving pressure plate 37 against springs 38 thereby releasing the drive between runner 27 and shaft 23. The primary function of the main clutch 22 is to enable shifts to be made manually or automatically in transmission 24. The relation of the fluid coupling to the control system is described in the copending application, Serial No. 661,298 filed April 11, 1946, by C. A. Neracher, et al.

Referring to the transmission in Fig. 2 the main drive pinion 32 is in constant mesh with the gear 40 of the countershaft gear cluster mounted for rotation on the countershaft 41. This gear cluster according to well known practice, comprises a low speed gear 42, a second speed gear 43, and a reverse gear 44 which is in constant mesh with the reverse idler gear 45. The transmission driven shaft 25 extends rearwardly to drive the ground wheels of the vehicle.

The terms second speed and direct drive will be referred to herein for simplicity but it is to be understood that the invention is not so limited. Any change between a relatively slow speed drive and a relatively fast speed drive may be obtained by the control apparatus when associated with a corresponding change speed mechanism.

The driven shaft 25 has mounted thereon the low speed and reverse gear 47 splined to the driven shaft for selective meshing with the countershaft low speed gear 42 or the reverse idler gear 45 for respectively transmitting low speed drive to the driven shaft 25 or the drive thereto in a reverse direction. Freely rotatable on shaft 25 is the second speed gear 48 in constant mesh with the countershaft gear 43 for transmitting a second speed ratio drive. The gear 32 drivingly carries a set of circumferentially spaced external clutch teeth 49. In a similar manner the gear 48 drivingly carries a set of clutch teeth 50.

Splined on the shaft 25 adjacent the forward extremity thereof, is an axially shiftable collar or sleeve 51. Blocker teeth rings 52 and 53 are carried by sleeve 51 and are provided with friction means (not shown) adapted to selectively cooperate with friction means provided with teeth 49 and 50. The blocker teeth rings 52 and 53 are adapted for slight rotation relative to sleeve 51 to facilitate synchronizing of gear speeds prior to clutching of shaft 25 through collar 51 with either gears 32 or 48 in a manner well known in the art.

The transmission is illustrated in its neutral position. To establish the direct or high speed driving connection between shafts 23 and 25, the collar 51 may be shifted axially to the left as viewed in Fig. 2 by the control means hereinafter described to engage the teeth 49 drivingly connected to the gear 32 carried by the driving shaft 23. The collar is drivingly carried by the shaft 25. The second speed driving connection is established by similarly moving the collar 51 to the right as viewed in Fig. 2 to engage teeth 50 carried by gear 48. The first or low speed is obtained by moving gear 47 which is splined to driven shaft 25 forwardly in Fig. 2 into engagement with the countershaft low speed gear 42. The drive then occurs from shaft 23 through main drive pinion 32, countershaft gear 40, countershaft low speed gear 42, gear 47, and driven shaft 25. Reverse drive is obtained by engaging gear 47 with reverse idler gear 45. The transmission mechanism thus described is an embodiment conventionally employed in motor vehicles.

Transmission 24 is provided with control means comprising selector cam 55 keyed to shaft 56 which is keyed to selector lever 57. Rotation of selector lever 57 rotates cam 55, and the outward end of cam 55 is lifted by this movement (see Figs. 3 and 5). Control shaft 58 (Fig. 3) is rotatably mounted in the trasmission housing. Cylindrical lever 59 surrounds shaft 58 and pin 60 mounted normally on the axis of the shaft fastens the lever to the shaft. Relative axial rotation is prevented by pin 60 but slight rotation of lever 59 on pin 60 is possible. Cylindrical lever 59 is provided with finger 61 adapted to penetrate the openings provided in forks 62 and 63 on shift rails 64 and 65. Spring 66 urges finger 61 to its downward position. Fork 62 engages collar 67 on low speed and reverse gear 47. Fork 63 engages collar 67 on low speed and reverse gear 47. Fork 63 engages collar 51 for selecting second or direct transmission drive.

Gear shift fork guide rail 68 supports the weight of forks 62 and 63. As illustrated in Fig. 4, finger 61 is normally in engagement with the fork 63 on the second speed and direct drive shift rail.

In operation, finger 61 is lifted or lowered to select the fork 62 or 63 which finger 61 is to move. Rotation of shaft 58, cylindrical lever 59, and finger 61 move the selected shift rail, fork, and collar to the left or right in Fig. 2 depending upon the direction of rotation of shaft 58. Lever 69 is provided and keyed to shaft 58 to rotate the latter.

Manual means are provided in the apparatus illustrated in Fig. 9 for the operation of the clutch and control of the transmission speed ratio drive. The clutch pedal 33 is rotatably mounted at 70 on a shaft, not shown. An extension 33' of clutch pedal 33 depends below rotatable mounting 70 and has fixed thereto a pin 71. A torque shaft 72 has one end thereof rotatably mounted on the vehicle frame, and the other end rotatably mounted adjacent the engine block, not shown, in a manner well known in the art. A lever 77 keyed to shaft 72 is provided with depending arm 78. A rod 79 operatively connects arm 78 with pin 71. A slot 80 provided in rod 79 permits relative movement in one direction between rod 79 and pin 71. The upper end of lever 77 may be operatively associated with the usual overcenter clutch spring. A lever 73 is keyed to torque shaft 72. A rod 75 connects lever 73 with clutch throwout fork 76. Clutch throwout fork 76 engages collar 34. It will thus be seen that depression of clutch pedal 33 rotates extension 33' about rotatable mounting 70 and through pin 71 retracts rod 79 and rotates arm 78, shaft 72 and lever 73, to push rod 75 and rotate clutch throwout fork 76 thereby moving collar 34 and disengaging the clutch 22.

A manual shift control rod 82 is shown in Fig. 9 as associated with the steering column housing 83. The manual shift control rod 82 is slidably mounted in brackets, not shown, and adapted for both axial and rotary movement. As is usual in the art, the axial movement is adapted to select the transmission shift rail 64 or 65 which is to be moved by finger 61 (Fig. 4), and rotation of the shift control rod 82 slides the shift rail in one of two directions (depending upon the direction of rod rotation) through the rotation of shaft 58 (Fig. 3) as described above. This effects the desired transmission speed ratio drive connection. A pair of spaced circumferential collars 85 and 86 located adjacent the base of rod 82 receive therebetween the end of a lever 87 which is rotatably mounted on the steering column housing 83. A rod 88 connects lever 87 with transmission selector lever 57. Axial movement of rod 82 is transmitted through this linkage to the selector lever 57.

An arm 91 is keyed to rod 82. A depending rod 92 connects arm 91 with a rotatable lever 93 mounted at 94. An arm 95 of lever 93 is connected to transmission shift lever 69 through rod 96. Rotation of rod 82 through the linkage just described rotates shift lever 69 and shaft 58 (Fig. 3) for manual transmission control.

Automatic means for controlling both the clutch and the transmission have been superimposed on the manual means described above. Referring to Fig. 9 an airtight housing 106 containing a cylinder 107 has tubular connections 108 and 108' with the engine intake manifold. A solenoid valve 109 is adapted to selectively open and close this connection and vent cylinder 107. A piston 110 is slidably mounted in cylinder 107 and a spring 111 acting on piston 110 and reacting on housing 106 urges piston 110 to one end of cylinder 107. Manifold low pressure or vacuum as it is commonly referred to, overcomes spring 111 when valve 109 is open. Piston rod 112 connects the piston 110 with an arm 113 carried by a collar 114 rotatably mounted on torque shaft 72. The lever 77 previously referred to is provided with a pin 115 which is adapted to be engaged by the arm 113 when the latter is rotated in a counterclockwise direction. When cylinder 107 is connected with the manifold through valve 109 and tubular passage 108, piston 110 is moved to the left in Fig. 9 and piston rod 112 rotates arm 113 in a counterclockwise direction. Arm 113 engages and carries therewith the pin 115 associated with lever 77 thereby rotating the lever. The lever 77 is keyed to the torque shaft 72 and the torque shaft 72 is thus rotated. Rotation of the shaft 72 rotates the lever 73 keyed thereto which pushes rod 75, rotates clutch throwout fork 76, and disengages the clutch 22. The rotation of the lever 77 and depending arm 78 in this counterclockwise direction does not cause a depression of the clutch pedal 33 because of the cooperation of the slot 80 in rod 79 and the pin 71. This pin and slot combination permits movement of rod 79 to the right in Fig. 9 without an accompanying depression of clutch pedal 33. When valve 109 disconnects cylinder 107 from the manifold and vents the cylinder, spring 111 returns the parts described to their original position permitting the clutch to reengage.

The movement of piston 110 also affects changes in transmission speed ratio drive by the movement of transmission collar 51 illustrated in Fig. 2. The automatic apparatus herein effects changes of speed ratio drive between a relatively slow drive of the driven wheels and a relatively fast drive or between second and direct drive as particularly described in relation to the Fig. 2 transmission. The torque shaft 72 is provided with the collar 114 which is rotatably mounted thereon. An arm 117 is carried by collar 114.

Figure 5:
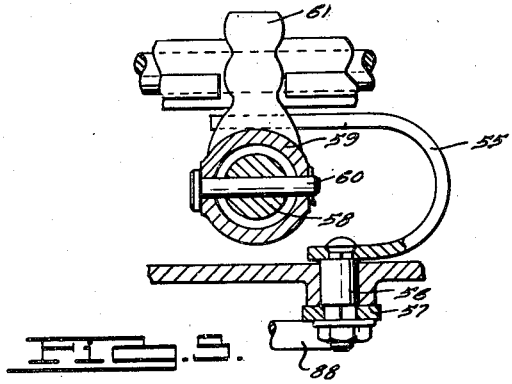
Fig. 5 is a section on the line 5—5 of Fig. 3.
Figure 6:
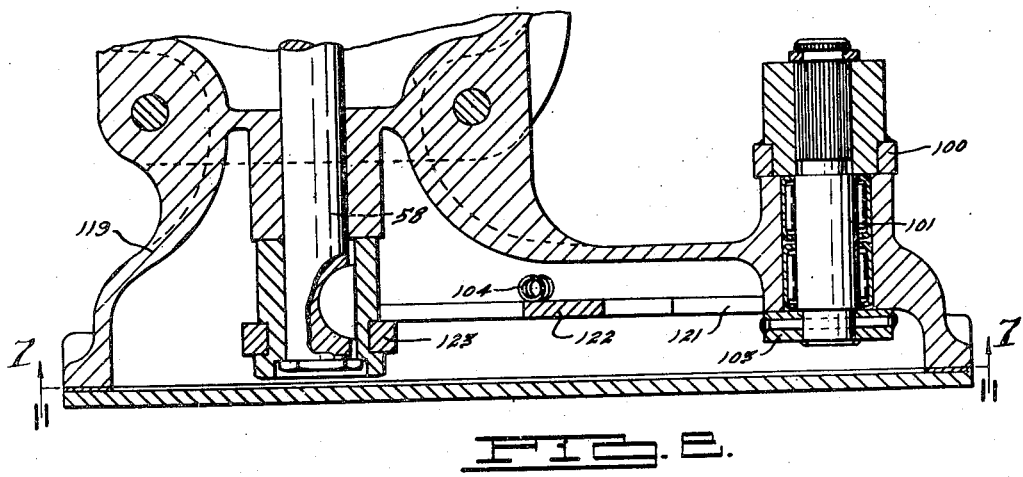
Fig. 6 is a side elevation of a portion of the apparatus shown in Fig. 3.

The arm 117 is designed to actuate a motion translating device to be referred to herein as an alternator and generally designated by the numeral 118. Alternator 118 is adapted to translate successive counterclockwise rotations of arm 117 to alternate counterclockwise and clockwise rotations of transmission shaft 58 (Fig. 3). Referring to the alternator in Figs. 3, 6, 7 and 8 a housing 119 is secured to the transmission at the lower end of shaft 58. A pair of fingers 121 and 122 are rotatably mounted on a lever 123 on opposite ends thereof. A pair of springs 124 and 124' urge fingers 121 and 122 together. The central portion of lever 123 is keyed to control shaft 58 previously referred to herein. A lever 100 is keyed to a shaft 101 outside of the alternator housing 119. A rod 102 operatively connects the lever 100 to the torque shaft arm 117. A spring 128 and dashpot 127 may be associated with rod 102 and lever 100 as shown in Fig. 9. They cooperate to cushion the alternator and transmission apparatus from sudden movement of the piston 110. The lever 100 and shaft 101 are thus rotated about in response to movement of the piston 110 in the vacuum cylinder. A lever 103 is keyed to shaft 101 inside of the housing 119. The fingers 121 and 122 are each provided with a recessed end portion 96 adapted to receive a pin 97 which is carried by the outer portion of lever 103. Thus rotation of the lever 103 in a counterclockwise direction will cause pin 97 to push one of the fingers to the left as viewed in Figs. 7 and 8 to thereby rotate lever 123 and shaft 58. The direction of rotation of shaft 58 will be dependent upon whether finger 121 or 122 was moved by pin 97. Rotation of shaft 58 will shift rail 65 by means of finger 61 (Figs. 3, 4 and 5). The direction of movement of the rail 65 will determine whether second speed drive or direct drive is obtained in the transmission. Movement of finger 121 in a counterclockwise direction will move collar 51 to the right in Fig. 2 and cause a second speed drive. Movement of finger 122 in a counterclockwise direction will move collar 51 to the left in Fig. 2 and cause a higher speed ratio drive to be effected. Rotation of lever 103 in a clockwise direction in Figs. 7 and 8 is always used to index the lever 103 relative to the fingers 121 and 122. Movement of piston 110 by vacuum through the linkage described rotates lever 103 in a counterclockwise direction and the spring return of piston 110 moves lever 103 in a clockwise direction to index it or condition it for the next successive shift.

Finger 121 is provided with an extension 98. A spring 104 has one end thereof connected to finger 121 and the other end thereof connected to housing 119. Extension 98 is long enough so that in all positions of the mechanism the extension overhangs the pin 97 so that the latter can prevent the fingers 121 and 122 and lever 123 from rotating in a clockwise direction as a unit about shaft 58 to an inoperative position out of reach of pin 97. Spring 104 prevents the fingers 121 and 122 and lever 123 from rotating in a counterclockwise direction to an inoperative position. If spring 104 and extension 98 were not provided the fingers might be moved out of operative relation with the pin 97 when manual shifts are made by the operator. Spring 104 also serves to bias the alternator so that if a shift is interrupted before completion as by the engine stalling the finger 121 will be engaged by pin 47 when vacuum is restored in cylinder 107. This assures that the collar 51 will be moved to the right in Fig. 2 and second speed drive obtained after the interruption.

When the lever 103 is moving to the left in Fig. 7 the lower surface of finger 121 will guide the finger 122 in its movement to the right so that it will be positioned for association with pin 97 on its next counterclockwise movement. When the finger 122 is being moved to the left in Fig. 8 by pin 97 the upper surface of finger 122 will guide the movement of finger 121 so that it will be positioned for association with pin 97 on its next counterclockwise movement.

The shafts 58 and 101 which penetrate the housing may be sealed against the entrance of dirt and moisture.

The location of the alternator 118 which is illustrated herein as on the lower portion of the transmission housing is described and claimed in copending application, Serial No. 755,612 filed by Maurice C. Robinson.

Means to control the actuation of the piston 110 is illustrated in Fig. 9. A grounded source 160 of electrical energy is connected through ignition switch 161 to a switch 130 by electrical conductor 162. Switch 130 is adapted to provide a selection between manual or automatic operation of the transmission and may be placed on the dash or other location convenient to manipulation by the driver of the vehicle. Electrical line 163 connects switch 130 with a switch 164 adapted to be closed when the throttle is substantially closed. Line 165 connects switch 164 with a two-way shift rail switch 166 having a finger thereon (not shown) adapted to be engaged by abutments on the transmission shift rail 65. Reference may be had to the copending application of Carl A. Neracher, Serial No. 694,084 for a more complete description thereof. A first circuit in switch 166 is disconnected and a second circuit is connected when the shift rail has completed its movement. This switch movement alternates with each transmission speed ratio change on the shift rail 65. A vehicle speed responsive governor 169 has one outlet terminal 170 and two inlet terminals 171 and 172 and is adapted to connect the outlet terminal with one inlet terminal below a predetermined speed and with the other inlet terminal above the predetermined speed. Each inlet terminal is connected to one of the circuits referred to for switch 166. Line 173 connects governor terminal 170 with solenoid valve 109 in manifold line 108. Line 174 grounds the circuit. Valve 109 is adapted to connect cylinder 107 with the manifold line 108 when energized and to close line 108 and vent cylinder 107 to atmosphere when not energized.

In the operation of the apparatus thus far described when the driver closes switch 130 to select automatic drive and then closes the switch 164 by manipulation of the usual accelerator pedal 167 to a throttle closed position above a predetermined vehicle speed, valve 109 is energized to admit vacuum to cylinder 107. Piston 110 is moved to the left in Fig. 9 and clutch 22 is disengaged through the linkage 112, 113, 115, lever 78, shaft 72, arm 73, rod 75, and clutch throwout fork 76. This motion of the piston also causes a delayed movement of transmission finger 61 and shift rail 65 through arm 113, collar 114, arm 117, rod 102, spring 128, arm 100, the alternator mechanism and shaft 58. The change in speed ratio drive caused by moving shift finger 61 moves the shift rail 65 which breaks the circuit at switch 166 thereby deenergizing solenoid valve 109 and permitting spring 111 to move piston 110 to the right in Fig. 9 permitting the clutch to reengage. The switch 166 is now connected with its other circuit and a complete electrical circuit will be made when the governor 169 connects the outlet terminal 170 with the other inlet terminal below a predetermined vehicle speed and the driver closes the throttle switch 164 by releasing accelerator pedal 167. The electrical circuit then being complete the solenoid valve 109 is energized and the piston 110 again moved to the left in Fig. 9 to repeat the process. The alternator mechanism will this time move the transmission shift finger 61 in the reverse direction from that previously experienced. The shift rail 65 will be moved and the collar 51 moved to cause a second speed drive in the Fig. 2 transmission.

In order that the driver cannot open switch 164 before the shift has been completed a resilient connection may be incorporated in the throttle linkage. Reference may be had to my copending application, Serial No. 687,248 for a description thereof. This device has been generally designated by the numeral 132 in Fig. 9 of the drawings.

I claim:

1. In a motor vehicle a variable speed transmission, a movable element associated with said transmission and adapted to effect a first speed ratio drive when moved in a first direction and to effect a second speed ratio drive when moved in a second direction, a movable member, a first means to move said member through a predetermined cycle including movement in a first direction and return in response to selected vehicle operating conditions, a second means to cause successive cycles of movement of said member to alternately move said element in said first direction and in said second direction, said second means comprising a first rotatable shaft operatively connected to said element, a pair of oppositely directed lever arms keyed to said shaft, a first finger element rotatably mounted on one of said lever arms and having an engageable portion, a second finger element rotatably mounted on the other of said lever arms and having an engageable portion, reciprocating means operatively connected to said member for reciprocation thereby in response to movement of said member through said cycle, said reciprocating means having an engaging element associated therewith which is adapted to engage said engageable portion of said first finger, and to move said first finger and said first rotatable shaft during movement of said movable member in its first direction to thereby move said moveable element in its first direction to effect said first speed ratio drive, said engaging element being adapted to index relative to said fingers when said movable member completes its cycle by its return movement and to thereby be positioned to engage said second finger and move said movable element in its second direction in response to the next successive movement of said moveable member in it first direction, spring means urging said fingers together, said fingers having sufficient length to be retained in contact with each other by said spring means throughout the entire range of relative movement of said fingers and cooperating surfaces on said fingers adapted as an incident to relative movement of said fingers to guide said fingers so that each finger is properly positioned for engagement in its turn by said engaging element of said reciprocating means.

2. In a motor vehicle a variable speed transmission, a movable element associated with said transmission and adapted to effect a first speed ratio drive when moved in a first direction and to effect a second speed ratio drive when moved in a second direction, a movable member, a first means to move said member through a predetermined cycle including movement in a first direction and return in response to selected vehicle operating conditions, a second means to cause successive cycles of movement of said member to alternately move said element in said first direction and in said second direction, said second means comprising a first rotatable shaft operatively connected to said element, a pair of oppositely directed lever arms keyed to said shaft, a first finger element rotatably mounted on one of said lever arms and having an engageable portion, a second finger element rotatably mounted on the other of said lever arms and having an engageable portion, reciprocating means operatively connected to said member for reciprocation thereby in response to movement of said member through said cycle, said reciprocating means having an engaging element associated therewith which is adapted to engage said engageable portion of said first finger, and to move said first finger and said first rotatable shaft during movement of said movable member in its first direction to thereby move said movable element in its first direction to effect said first speed ratio drive.

said engaging element being adapted to index relative to said fingers when said movable member completes its cycle by its return movement and to thereby be positioned to engage said second finger and move said movable element in its second direction in response to the next successive movement of said moveable member in its first direction, spring means yieldably urging said fingers together, said fingers having sufficient length to be retained in contact with each other by said spring means throughout substantially the entire range of relative movement of said fingers, said spring means accommodating separation of said fingers by said engaging element during said return movement of said engaging element, said separation permitting movement of said engaging element from a position between said fingers to a position beyond said fingers.

3. In a motor vehicle a variable speed transmission, a movable element associated with said transmission and adapted to effect a first speed ratio drive when moved in a first direction and to effect a second speed ratio drive when moved in a second direction, a movable member, a first means to move said member through a predetermined cycle including movement in a first direction and return in response to selected vehicle operating conditions, a second means to cause successive cycles of movement of said member to alternately move said element in said first direction and in said second direction, said second means comprising a first rotatable shaft operatively connected to said element, a pair of oppositely directed lever arms keyed to said shaft, a first finger element rotatably mounted on one of said lever arms and having a slotted portion, a second finger element rotatably mounted on the other of said lever arms and having a slotted portion, a second rotatable shaft operatively connected to said member for rotation thereby in a first direction and in a second direction in response to movement of said member an arm keyed to said second shaft and adapted to rotate therewith, a pin on said arm adapted to engage said slotted portion of said first finger as said arm moves toward said first rotatable shaft and to move said first finger and said first rotatable shaft during movement of said movable member in its first direction to thereby move said movable element in its first direction to effect said first speed ratio drive, said pin being adapted to index relative to said fingers by movement away from said first rotatable shaft when said movable member completes its cycle by its return movement and to thereby be positioned to engage said second finger and move said movable element in its second direction in response to the next successive movement of said movable member in its first direction, spring means urging said finger elements and said lever arms to rotate as a unit in said first direction relative to the axis of said first shaft, said first finger element being provided with an extended portion adapted to engage said pin to limit the rotation of said finger elements and said spring means, said extended portion having sufficient length so that substantially all movement of said pin in a direction away from said first rotatable shaft is made with said pin in engagement with a portion of said first finger element.

OTTO W. SCHOTZ.

REFERENCES CITED

The following references are of record in the file of this patent:

UNITED STATES PATENTS

| Number | Name | Date |
|---|---|---|
| 501,680 | Fraser | July 18, 1893 |
| 1,773,216 | Campbell | Aug. 19, 1930 |
| 2,208,828 | Adams | July 23, 1940 |

Certificate of Correction

Patent No. 2,487,482                                     November 8, 1949

OTTO W. SCHOTZ

It is hereby certified that errors appear in the printed specification of the above numbered patent requiring correction as follows:

Column 3, lines 73 and 74, strike out the sentence "Fork 63 engages collar 67 on low speed and reverse gear 47."; column 8, line 34, for the word "it" read *its*; and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*